United States Patent

Tomiyama

[11] Patent Number: 5,568,852
[45] Date of Patent: Oct. 29, 1996

[54] CLUTCH COVER ASSEMBLY HAVING CLUTCH DISK WEAR COMPENSATION MEANS

[75] Inventor: Naoki Tomiyama, Settsu, Japan

[73] Assignee: Kabushiki Kaisha Daikin Seisakusho, Osaka, Japan

[21] Appl. No.: 448,953

[22] Filed: May 24, 1995

[30] Foreign Application Priority Data

May 31, 1994 [JP] Japan ................... 6-118822

[51] Int. Cl.$^6$ .................................. F16D 13/54
[52] U.S. Cl. ................... 192/70.25; 192/89.24; 192/111 A
[58] Field of Search ............... 192/70.25, 89.23, 192/89.24, 111 A

[56] References Cited

U.S. PATENT DOCUMENTS

| | | | |
|---|---|---|---|
| 4,924,991 | 5/1990 | Takeuchi | 192/11 A |
| 4,958,714 | 9/1990 | Cooke et al. | 192/70.25 |
| 5,123,512 | 6/1992 | Nemoto et al. | 192/70.25 |
| 5,419,418 | 5/1995 | Uenohara et al. | 192/70.25 |

FOREIGN PATENT DOCUMENTS

| | | | |
|---|---|---|---|
| 4239292 | 5/1993 | Germany | 192/111 A |
| 406074252 | 3/1994 | Japan | 192/111 A |
| 2264989 | 9/1993 | United Kingdom | 192/11 A |

*Primary Examiner*—Charles A. Marmor
*Assistant Examiner*—Chong H. Kim
*Attorney, Agent, or Firm*—Shinjyu Office of Patent Attorneys

[57] ABSTRACT

A clutch cover assembly comprises a pressure plate, a base cover that is provided on the side that is opposite to the pressing face of the pressure plate, a diaphragm spring, urging mechanisms 25, and restraining mechanisms which restrict movement of the base cover towards the diaphragm spring but allow this movement of the base cover in correspondence to the amount of wear of a clutch disk. An urging mechanism 25 having a ring plate 27 which is disposed between the pressure plate and the base cover, a coil spring 33 which is supported by the ring plate 27 and is for the purpose of moving the base cover 20 towards the diaphragm spring, and a guide element 34 which is detachably mounted on the ring plate 27 and guides the coil spring 33.

30 Claims, 8 Drawing Sheets

CLUTCH COVER ASSEMBLY HAVING CLUTCH DISK WEAR COMPENSATION MEANS

BACKGROUND OF THE INVENTION

A) Field of the Invention

The present invention relates to a clutch cover assembly for engaging and disengaging a clutch disk from a flywheel. More specifically, the present invention relates to a clutch cover having a wear adjustment with spring biased wedge elements.

B) Description of the Related Art

A clutch cover assembly is normally mounted on the flywheel of an engine, grips a clutch disk between itself and the flywheel and serves to transmit an engines drive power to a speed-change gear. It is desirable for such a clutch cover assembly and clutch disk to have a long-life. Attempts have therefore been made to increase the effective useful thickness of clutch disk friction facings by fixing them to a cushioning plate without using rivets, etc, to extend clutch life.

There has also been proposed a clutch cover assembly structure which, as described in the disclosure of Japanese Laid-open Patent Application No. 63-27092, is designed to make it possible for the biasing load of a diaphragm spring to be automatically restored to its initial load strength when the facings become worn. This clutch cover assembly includes fulcrum rings or support elements that are located between the diaphragm spring and the pressure plate and are for the purpose of supporting the diaphragm spring. In this design, a wear compensation mechanism urges the diaphragm spring in a direction extending away from the pressure plate.

The wear compensation mechanism includes slide elements that are located in a groove of the pressure plate and are movable circumferentially and coil springs that urge these slide elements in the circumferential direction. The fulcrum springs and the slide elements have mutually contacting wedge surfaces, and when, after facing wear has occurred, pushing pressure on the diaphragm spring is released, the slide elements push the fulcrum springs in the circumferential direction, and the fulcrum springs move towards the diaphragm spring biasing section side. As a result, the diaphragm spring's biasing attitude does not change, and its setting load is maintained at the initial load.

In the above conventional structure, the coil springs are installed in a compressed state between the slide elements and the pressure plate support section. In order to install the coil springs in this location, the coil springs are assembled in set positions, and then, while the coil springs are kept compressed, the slide elements are set in place. It sometimes happens that, when the coil springs are compressed, they become bent and so fail to be installed in a correct attitude. When the coil springs' attitudes are incorrect, changes in the urging force exerted on the fulcrum rings occur.

Also, the efficiency of assembly work is poor, since the above installation work has to be done while the resilient force of the coil springs is acting. As a result, assembly takes a long time.

Further, the resilient force of the coil springs acts to move the fulcrum springs away from the pressure plate after they have been set in place. Suppressing this movement necessitates the use of special jigs and makes work troublesome.

SUMMARY OF THE INVENTION

It is the object of the present invention to make it possible to assemble the elements of a wear compensation mechanism in correct attitudes or orientations at the time of assembling.

Another object of the invention is to shorten the time needed for the assembly of a wear compensation mechanism.

A still further object of the invention is to make it easy to suppress movement of associated support elements during assembly of a wear compensation mechanism in a clutch cover assembly.

It is still a further object of the invention to effect assembly of a clutch cover assembly without the use of special jigs typically necessary with a wear compensation mechanism.

In one aspect of the present invention, a clutch cover assembly is provided with a wear compensation mechanism. The clutch cover is connectable to a flywheel. A pressure plate is disposed within the cover having a radially extending friction face formed on a first side thereof for engagement with a clutch disk disposed between the pressure plate and the flywheel. A support element is coupled to the pressure plate for rotation therewith and for axial displacement relative to the pressure plate. A diaphragm spring is also disposed within the clutch cover for biasing the pressure plate towards a flywheel via the support element. An urging mechanism is disposed between the pressure plate and the support element, having a plate element, urging elements supported by the plate element for biasing the support element towards the diaphragm spring, and guide elements which are detachably mounted on the plate element and at least partially retain the urging elements. Further, the clutch cover assembly includes a restraining mechanism which allows for axial movement of the support element with respect to the pressure plate towards the diaphragm spring in response to wear of the clutch disk.

In another aspect of the invention, the urging elements are coil springs and a portion of the guide elements extend through the coil springs.

In another aspect of the invention, the plate element engages the pressure plate and is formed with engagement portions which extend away from the pressure plate, and the guide elements have one end in engagement with the engagement portions.

In another aspect of the invention, each of the guide elements is formed with a projection portion which extends in a direction which intersects the direction a corresponding one of the urging elements extends.

In another aspect of the invention, each of the guide elements is formed with a projection portion which extends axially inwardly.

In another aspect of the invention, the urging mechanism further includes a plurality of wedge mechanisms each having biasing means to urge the support element towards the diaphragm spring. Further, each of the wedge mechanisms includes: a first wedge element having a first slope surface, the first wedge element being fixed to the plate element for rotary movement therewith; a second wedge element formed with a second slope surface, the second wedge element fixed to the support element; and one of the above mentioned urging element, where the urging element urges the first wedge elements and the second wedge elements such that the second wedge elements move outwardly away from the pressure plate. Still further, one end of each of the guide elements is engaged with one of the second wedge elements to allow for relative axial movement relative thereto. Further, the urging elements urge the wedge mechanisms in the circumferential direction.

In still a further aspect of the invention, the plate element is ring-shaped, and the urging mechanism includes plural sets of the wedge mechanisms, the urging elements and the guide elements on the plate element in the circumferential direction.

In still another aspect of the invention, the plate element is divided into plural arcuate segments.

Still a further aspect of the invention relates to assembly of the clutch cover. The method for assembling a clutch cover assembly includes:

positioning a first portion of a wear compensation mechanism on a pressure plate;

positioning a second portion of a wear compensation mechanism on a clutch cover;

mounting the clutch cover to the pressure plate for limited axial movement with respect to the pressure plate and rigidly attached to the pressure plate for rotational movement therewith; and inserting at least one spring biasing element between the first and second portions of the wear compensation mechanism.

In the clutch cover assembly according to the invention, when the biasing pressure element presses the support element, the pressure plate presses the friction element against the flywheel. When, in this clutch engagement state, the friction element becomes worn, the pressure plate moves towards the flywheel due to reduced thickness of friction linings on the clutch disk. When the biasing pressure of the biasing pressure element is released, the support element is moved in a direction going away from the pressure plate by the urging force of the urging elements. This movement of the support element is permitted by the restraining element to a degree corresponding to the amount of wear of the friction element. As a result, the biasing attitude of the biasing pressure element is maintained in the initial set state, and the pressing load is maintained at the initial load.

When assembling an urging element, first, the urging element is mounted on a guide element. Then, while being used to compress the urging element, the guide element is fitted on the plate element. Since use is made here of a guide element that is detachably mountable on the plate element, the urging element can be mounted in a correct attitude in the urging mechanism. Further, the urging element assembly work is easy, and the assembly time is shortened. Since the assembly work is easy, urging elements and guide elements can be assembled in a state in which movement of the support element is restrained by the restraining mechanism. Therefore, it is easy to suppress movement of the support element at the time of assembly.

When the urging elements are coil springs and the guide elements are located inside the coil springs, there is no need for extra space for the guide elements, and the urging mechanism is therefore compact.

When the plate element has engagement portions that rise in the direction going away from the pressure plate, and the guide elements have one end engaging the engagement portions, the urging elements are guided at locations that are removed from the pressure plate. As a result, they are not subjected to adverse effects caused by the heat of the pressure plate.

When the guide elements have projections which project in directions that intersect the directions in which the resilient elements extend, an operative can hold these projections and assemble the guide elements and urging elements in the urging mechanism. Thanks to this, the assembly work is simple, and the assembly time is shortened.

When the urging mechanisms further include wedge mechanisms and the support element is moved in a direction going away from the pressure plate as the result of the urging elements exerting urging force on the wedge elements, there is improvement of the degree of freedom of the orientation of the urging elements.

When the wedge mechanisms include first wedge elements and second wedge elements, and the urging elements urge the second wedge elements against the first wedge elements, there is no need to machine the support element, since pairs of elements are used.

When the other ends of the guide elements engage the second wedge elements in a manner permitting axial movement, the attitude of the guide elements and urging elements is not liable to be changed by the second wedge elements when the second wedge elements move in the axial direction.

When the urging elements urge the wedge mechanisms in the circumferential direction, effects due to the rotational speed of the flywheel are less liable to occur. It is therefore possible to maintain the attitude of the biasing pressure element with good precision in accordance with the amount of wear of the friction element.

When the plate element is ring-shaped, and the urging mechanism is constituted by installing sets consisting of wedge mechanisms, urging elements and guide elements on the plate element in plural locations in the circumferential direction, the sets of the urging mechanism act synchronously in the circumferential direction. Consequently variation of the height of the support element is suppressed, and tilting of the biasing pressure element is reduced.

When the plate element is divided into plural parts and so installed that it forms arcs, the structure is simplified and manufacturing costs are reduced.

These and other objects, features, aspects and advantages of the present invention will become more fully apparent from the following detailed description of the present invention when taken in conjunction with the accompanying drawings where like reference numerals denote corresponding parts throughout, in which:

DETAILED DESCRIPTION OF THE PREFERRED EMBODIMENT

Figure 1:
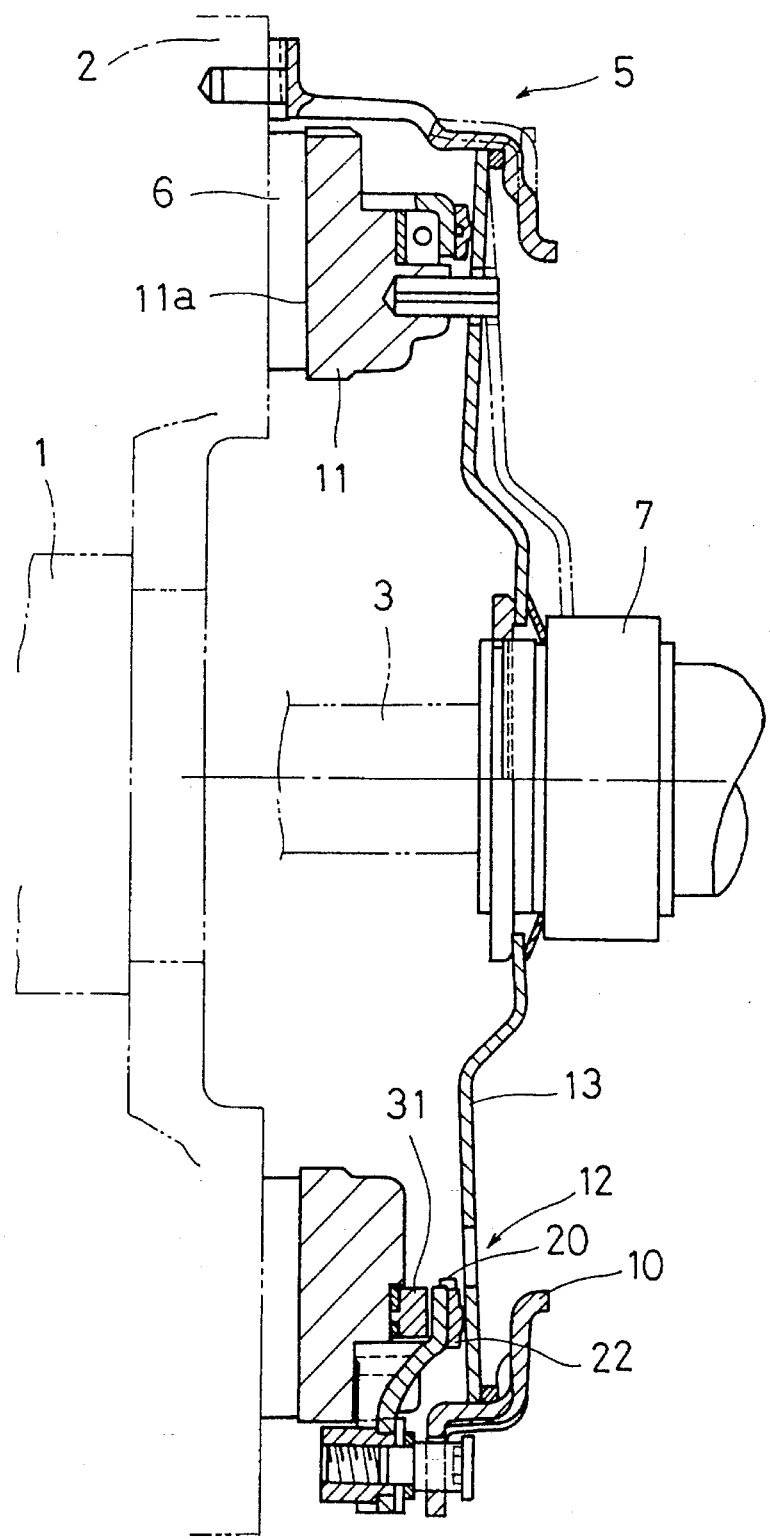
FIG. 1 is a fragmentary, part cross-section, part elevation, schematic side view of a clutch mechanism with a wear compensation device in accordance with one embodiment of the present invention.

A clutch in accordance with one embodiment of the present invention is shown in FIG. 1. The clutch is a device which is for the purpose of transmitting torque from a flywheel 2 connected to a crankshaft 1 of an engine (not shown). A main drive shaft 3 that extends from a transmission (not shown). The clutch device is for selectively engaging and disengaging torque transmittance between the engine and the transmission. The engine (not shown) is located on the left in the drawing and the transmission (not shown) is located on the right in the drawing. Hereinafter, the left hand portion of FIG. 1 is referred to as the engine side and the right hand portion of FIG. 1 is referred to as the transmission side.

The clutch includes several main elements such as, a clutch cover assembly 5 which is fixed to the flywheel 2, and a clutch disk assembly (whose central portion is not shown in FIG. 1 for clarity) which includes a clutch disk 6. The center of the clutch disk assembly is in spline engagement with the main drive shaft 3 extending from the transmission. A release mechanism 7 is provided around the main drive shaft 3 in a manner permitting free axial movement.

Figure 2:
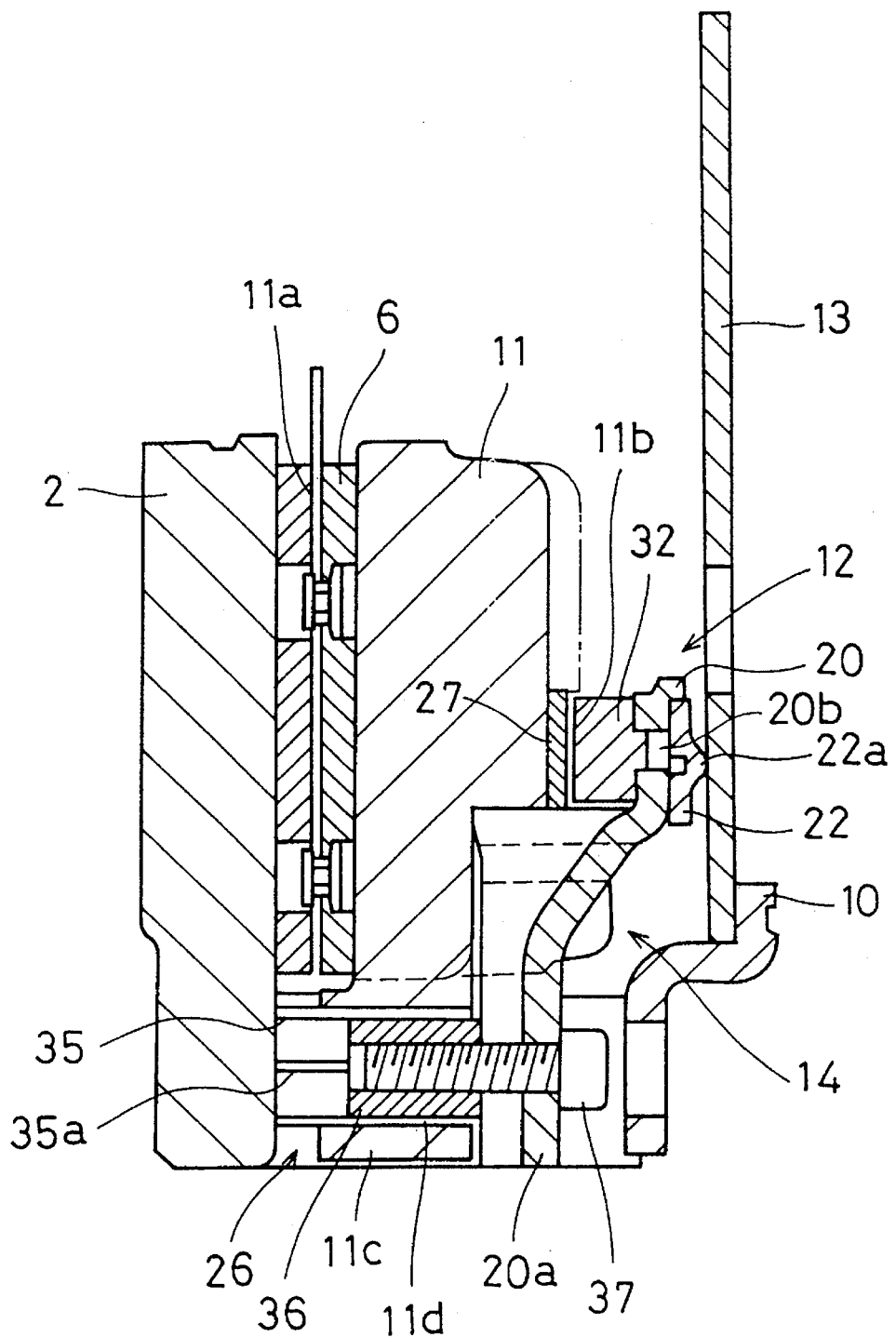
FIG. 2 is a fragmentary cross-section of a portion of the clutch mechanism depicted in FIG. 1 shown on a slightly enlarged scale.

The clutch cover assembly 5 is shown in detail in FIG. 2 is one embodiment of the present invention.

The clutch cover assembly 5 includes a clutch cover 10, a pressure plate 11, a support mechanism 12 that is disposed on the pressure plate 11, between the pressure plate 11 and the clutch cover 10, and a diaphragm spring 13 that acts via the support mechanism 12 to urge or bias the pressure plate 11 towards the flywheel 2. The clutch plate assembly 5 also includes a wear compensation mechanism 14.

Figure 3:
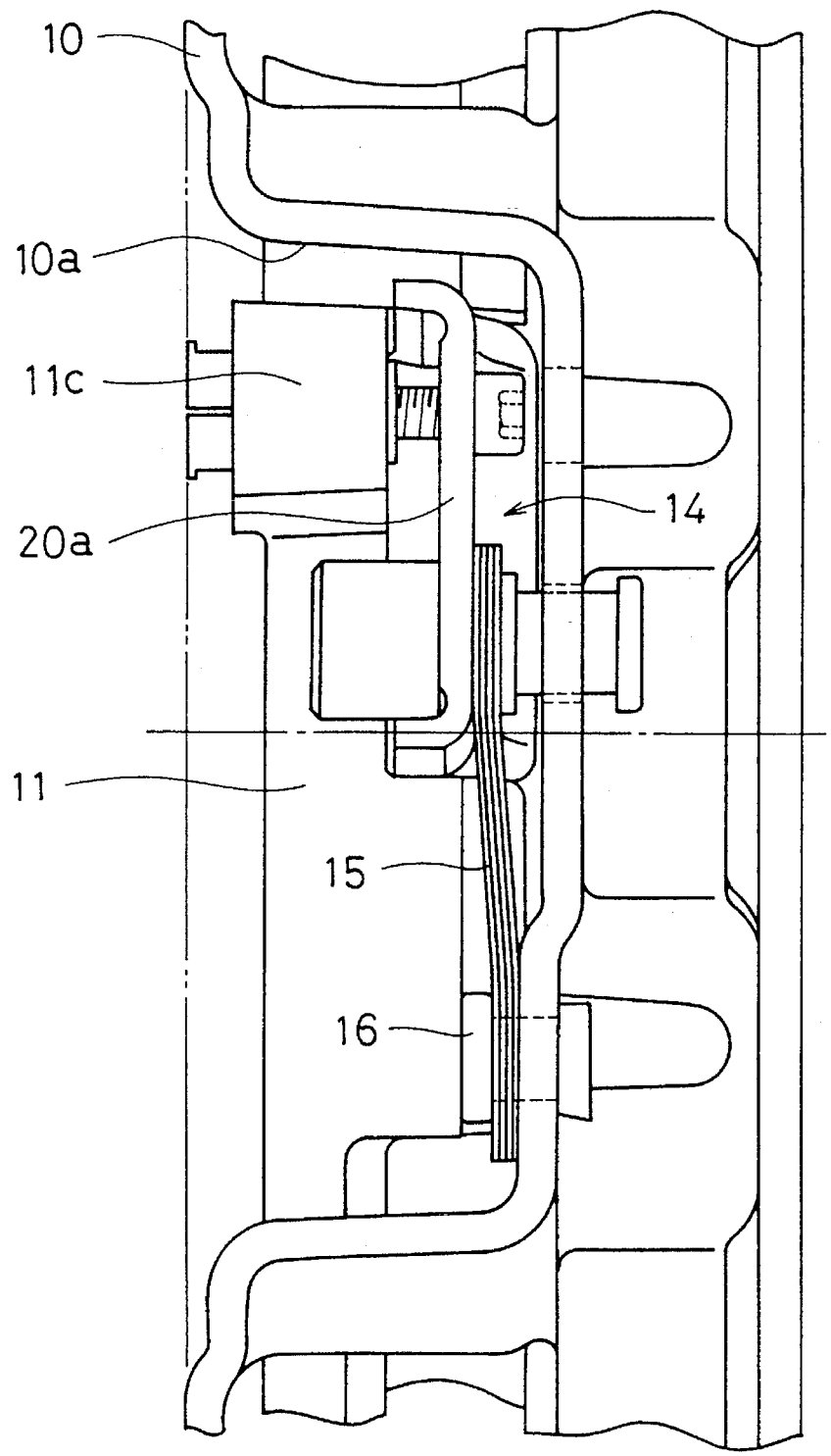
FIG. 3 is a fragmentary side elevation of a portion of the clutch mechanism depicted in FIG. 1.

The clutch cover 10 is a generally dish-shaped element, and its outer peripheral edge is fixed to the flywheel 2. As indicated in FIG. 3, openings 10a are formed at equal intervals, in the circumferential direction, in the outer periphery wall of the clutch cover 10. Strap plates 15, which are constituted by plural metal bands and extend in directions that are tangential to the circumference, are provided at locations corresponding to respective openings 10a. The strap plates 15 are attached at one end to the clutch cover 10 by rivets 16, and their other ends are fixed to portions of the support mechanism 12. The strap plates 15 are elements which cause the pressure plate 11 to rotate together with the clutch cover 10, and which provide relatively weak biasing the pressure plate 11 away from the clutch disk 6 when the pressure exerted by the diaphragm spring 13 is released. It should be understood that the biasing of the strap plate 15 is sufficient to urge the pressure plate 11 to move away from the clutch disk 6 when the diaphragm spring 13 is not urging the pressure plate 11 toward the clutch disk 6, but provides relatively weak biasing compared to the biasing strength of the diaphragm spring 13.

The pressure plate 11 is a generally ring-shaped element, and it is disposed inside the clutch cover 10. On a side of the pressure plate 11 facing the flywheel 2, a pressing face 11a is formed for friction contact with the clutch disk 6 between itself and the flywheel 2. A ring-shaped step portion 11b is formed on the outer periphery portion of the pressure plate 11 and plural fixing portions 11c that project towards respective openings 10a of the clutch cover 10 are formed integrally with the outer periphery portion of the pressure plate 11.

The support mechanism 12 includes an annular plate-like ring base cover 20, preferably made of sheet metal material, and a support plate 22 that is located between the base cover 20 and the diaphragm spring 13.

The base cover 20 is formed in a ring shape and is so installed that it covers the outer periphery portion of the pressure plate 11. The base cover 20 further has a flange 20a which projects outward in the circumferential direction towards the openings 10a of the clutch cover 10. A portion of the wear compensation mechanism 14 engages the flange 20a. Further, one end of each of the strap plates 15 are fixed to the flange 20a (see FIG. 3). The support plate 22 is a plate element made of sheet metal, and is formed in the shape of a ring. In an intermediate portion of the support plate 22, in the radial direction, an annular support portion 22a is formed which extends towards the diaphragm spring 13. A portion of the diaphragm spring 13 is supported on this support portion 22a. The support plate 22 is, in the preferred embodiment, a dished spring.

In the support mechanism 12, since the base cover 20 is made of sheet metal, manufacturing is relatively simple and it is possible to design for reduction of weight. Since the diaphragm spring 13 is supported by a support plate 22 which is separate from the base cover 20, it is possible to form holes 20b in the base cover 20 and engage and fix second taper elements 32 (described below). In this case, elements such as pins, etc. for fixing are unnecessary.

The diaphragm spring 13 is installed concentrically with the clutch cover 10. Also, as shown in FIG. 1, the transmission side of the outer peripheral edge portion of the diaphragm spring 13 is supported on the clutch cover 10, and its loading pressure portion, which is on an intermediate portion in the radial direction, acts via the support plate 22 and biases the pressure plate 11 towards the flywheel 2. When, the inner peripheral edge of the diaphragm spring 13 is pulled towards the transmission side by the release device 7, the loading pressure portion of the diaphragm spring 13 moves away from the support plate 22, and the pressure biasing the pressure plate 11 against the flywheel 2 is released.

With reference now to FIGS. 2, 4, 5, 6 and 7, the wear compensation mechanism 14 includes an urging mechanism 25 that is installed in the step portion 11b of the pressure plate 11, and restraining mechanisms 26 installed on respective fixing portions 11c of the pressure plate 11 (FIG. 2).

Figure 4:
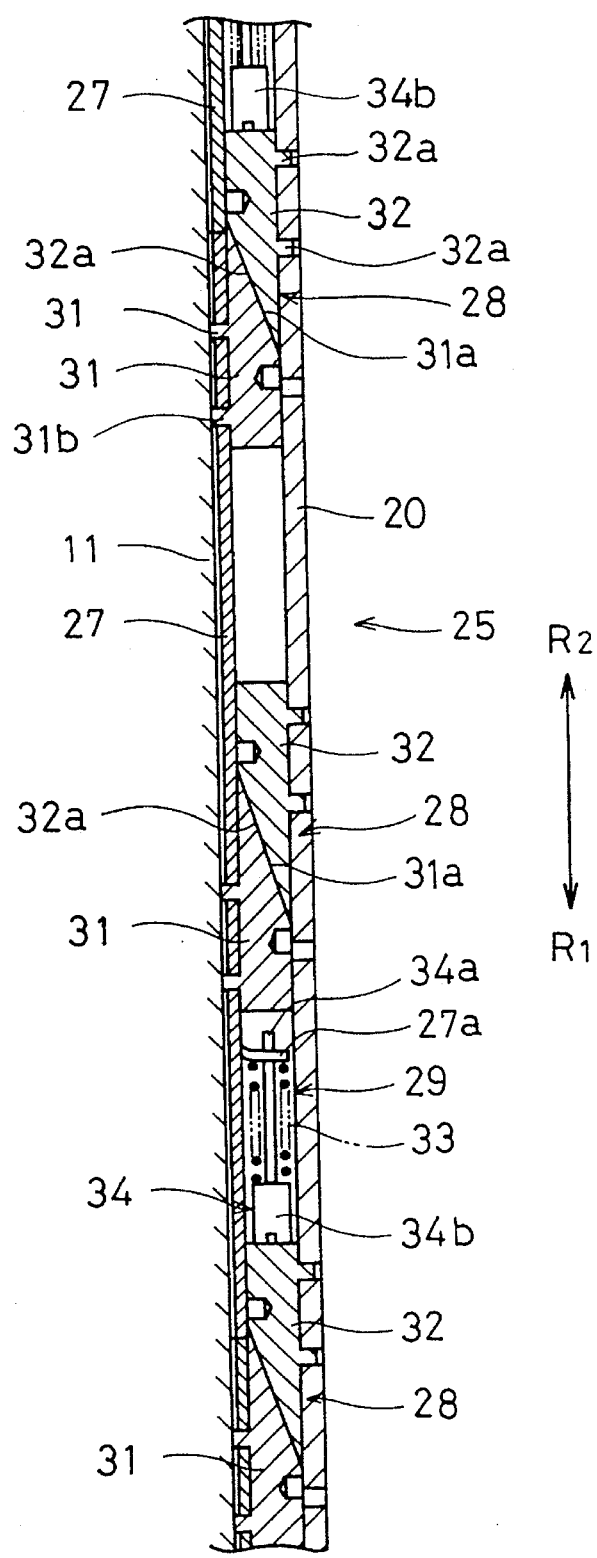
FIG. 4 is a fragmentary, arcuate section of a portion of the wear compensation mechanism employed in the clutch mechanism depicted in FIG. 1.
Figure 5:
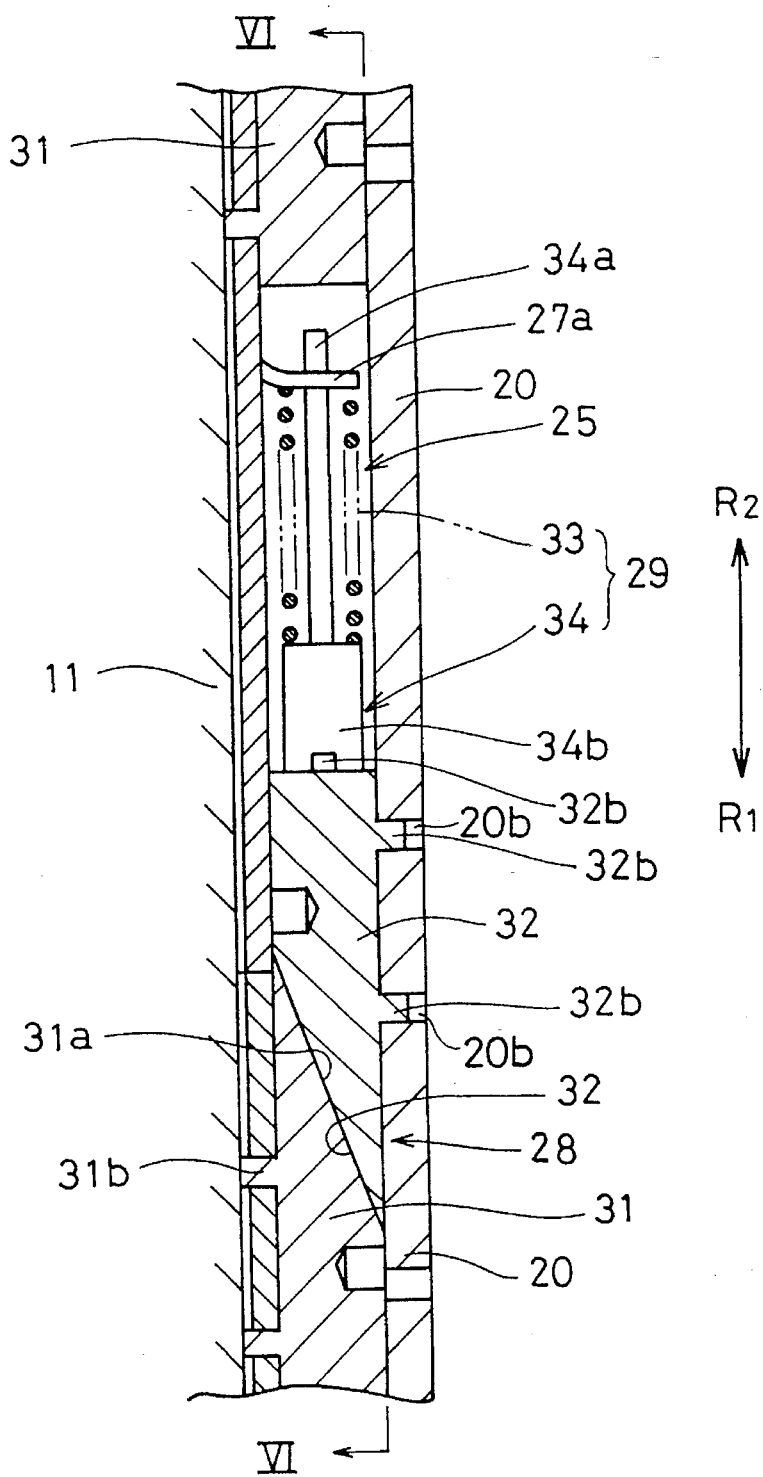
FIG. 5 is a fragmentary, part section, part elevation of a portion of FIG. 4 on a slightly enlarged scale.

The urging mechanism 25 will now be described with reference to FIGS. 4–7. It should be understood that the urging mechanism 25 is an annular shaped mechanism disposed in the annular step portion 11b. The cross-section views in FIGS. 4 and 5 are taken along an arcuate line that generally follows the arcuate shape of the annular step portion 11b. The urging mechanism includes a ring plate 27, plural wedge mechanisms 28, and plural spring mechanisms 29.

The ring plate 27 is installed in the step portion 11b of the pressure plate 11. The ring plate 27, in the preferred embodiment, is an assembly of a plurality of arc plates disposed end to end without gaps, so that, overall, a ring shape is formed. The ring plate 27 contacts the step portion 11b and it is free to move circumferentially relative to the pressure plate 11 within the step portion 11b.

Figure 6:
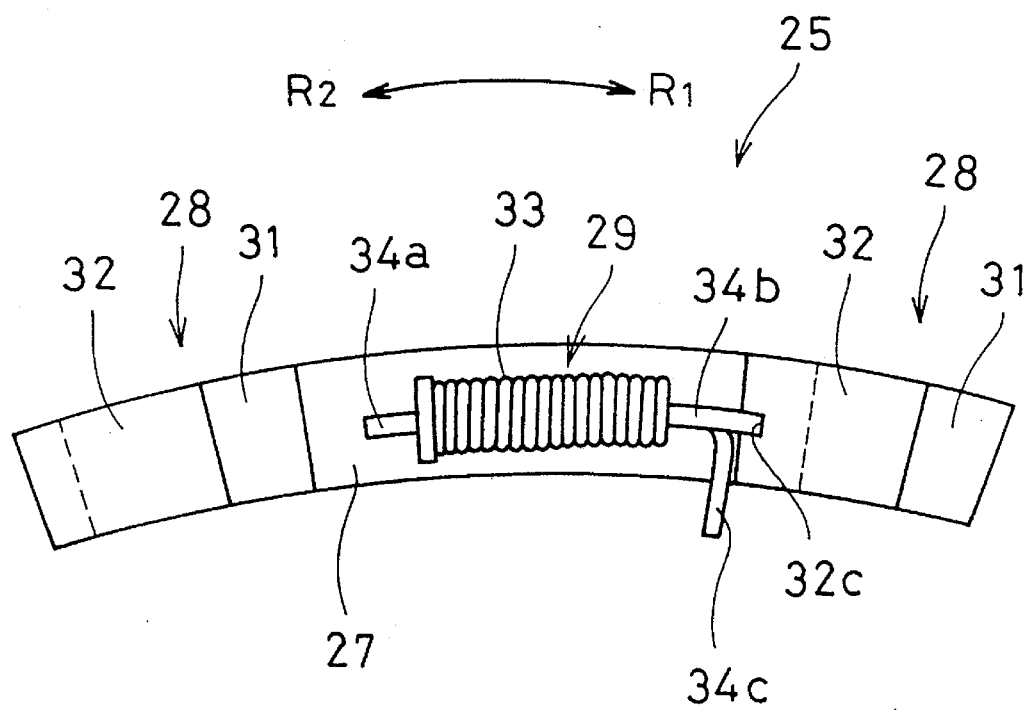
FIG. 6 a fragmentary elevation of a portion of the wear compensation mechanism depicted in FIG. 5 taken along the line VI—VI.
Figure 7:
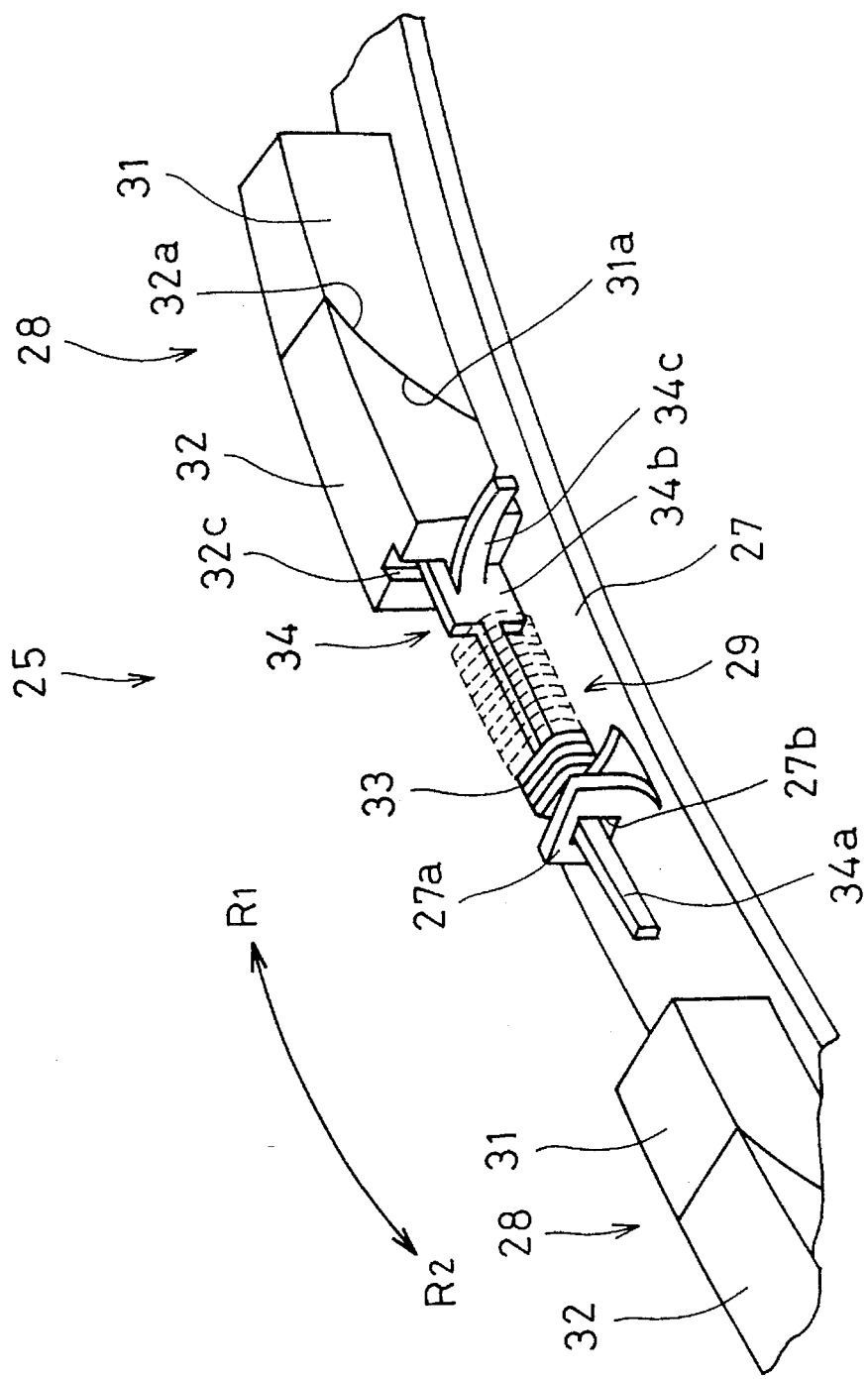
FIG. 7 is a fragmentary perspective view of a portion of the wear compensation mechanism depicted in FIGS. 4, 5 and 6 with portions of the clutch mechanism removed for clarity.

A plurality of wedge mechanisms 28 are installed between the ring plate 27 and the base cover 20. Each wedge mechanism 28 includes of a first taper block 31 and a second taper block 32. As shown in FIG. 4, the first taper block 31 is fixed for rotation with the ring plate 27 via engagement of projections 31b formed on one edge surface the first taper block 31 with corresponding holes formed in the ring plate 27. The second taper block 32 is fixed to the base cover 20 via engagement of projections 32b formed on one edge surface of the second taper block 32 with corresponding holes formed in the base cover 20. The first taper block 31 extends circumferentially along the ring plate 27, and it has a first slope surface 31a which extends circumferentially towards the base cover 20. The second taper blocks 32 are disposed in the R2 direction, in the circumferential direction, of respective first taper blocks 31 (see FIGS. 5 and 6). Like the first taper blocks 31, the second taper blocks 32 extend circumferentially along the ring plate 27. The second taper blocks 32 have second slope surfaces 32a that extend circumferentially towards the ring plate 27. The first slope surfaces 31a and the second slope surfaces 32a are in mutual contact. As is shown in FIGS. 6 and 7, axially extending grooves 32c are formed in an end surface of each of the second taper blocks 32.

In the circumferential direction, the spring mechanisms 29 are located between successive pairs of wedge mechanisms 28. Each spring mechanism 29 includes a coil spring 33 and a guide element 34. A plurality of risers 27a are formed in space apart portions of the ring plate 27 corresponding to the location of each spring mechanisms 29. A hole 27b is formed in each risers 27a.

A guide element 34 having a rod member 34a, a wide portion 34b defined at one end of the rod member 34a which, in the axial direction, is wider than the rod member 34a, and a projection 34c which extends radially inward away from the central portion of one end of the wide portion 34b. A coil spring 33 is disposed about the rod member 34a of the guide element 34, a first end of the coil spring 33 engaging the wide portion 34b, and a second end of the coil spring 33 engaging a corresponding riser 27a. Since each guide element 34 lies inside a coil spring 33, there is no need for providing extra space for the guide element 34, and the spring mechanism 25 and urging mechanism 29 are therefore compact and occupy a relatively-small place. In the assembled state shown in detail in FIG. 7, the guide element 34 is located between a riser 27a and a second taper block 32. The rod member 34a of the guide element 34 is inserted in the hole 27b of the riser 27a such that the coil spring 33 biases the ring plate 27 for movement in the R2 direction. The front end of the guide element's wide portion 34b is inserted in the groove 32c of the second taper block 32, and the second taper block 32 can move axially relative to the guide element 34.

One end of the coil spring 33 contacts the riser 27a, and its other end contacts the wide portion 34b. Since the coil spring 33 is supported by the riser 27a, it is spaced apart from the ring plate 27. In the assembled state, the coil spring 33 is compressed and its resilient force acts via the guide element 34 to urge the second taper block 32 in the circumferential direction R1. The resilient force of the coil spring 33 also acts via the riser 27a to urge the ring plate 27 in the circumferential direction R2. Therefore, each first taper block 31 is acted on by a force that tries to move it towards a second taper block 32 (in the R2 direction). In other words, the plural second taper blocks 32 are subjected to a force that constantly urges them upwards due to co-acting surfaces 31a and 32a.

As shown in FIG. 2, the restraining mechanisms 26 are mounted on the fixing elements 11c of the pressure plate 11. A plurality of holes 11d are formed in the fixing elements 11c. Each restraining mechanism 26 has, as main elements, a wedge collar 35, a wedge 36 and a bolt 37.

The wedge collar 35 is formed in a cylindrical shape and one wedge collar 35 is slidably inserted, in the axial direction, in each hole 11d. An axially directed slit 35a is formed in the wedge collar 35 and permits expansion and contraction in the radial direction. The wedge collar 35 has a tapered inner peripheral surface that becomes narrower with increasing distance from the flywheel 2. In a state in which the clutch disk 6 is gripped between the pressure plate 11 and the flywheel 2, one end of the wedge collar 35 contacts the outer surface of the flywheel 2. The wedge 36 has a tapered outer peripheral surface that fits against the inner peripheral surface of the wedge collar 35, and inside it there is a threaded hole into which the bolt 37 is screwed and retained. The bolt 37 passes through a hole formed in the flange 20a of the base cover 20 and its head is engaged on the clutch cover 10 side of the flange 20a. Since the flange 20 is engaged by the bolt's head, it is restrained from moving outwardly from the direction of the axis of the support mechanism 12.

The clutch cover 10 has holes formed in portions corresponding to the heads of the bolts 37.

Next, the operation will be described.

At the time of clutch engagement, the diaphragm spring 13, acting via the support mechanism 12, pushes the pressure plate 11 towards the flywheel 2, and as a result the clutch disk 6 is gripped between the pressure plate 11 and the flywheel 2. Rotary power from the flywheel 2 is therefore now transmitted via the clutch disk 6 to the transmission side.

When, in response to a release control action, contact between the diaphragm spring 13 and the support mechanism 12 is terminated, the strap plates 15 exert on the base cover 20 a force which acts to pull it up towards the diaphragm spring 13 side. This force acts on the heads of the bolts 37 via the flange 20a of the base cover 20 and, further, it acts on the wedge collars 35 via the wedges 36. Since the wedges 36 and wedge collars 35 are in taper contact, the wedges 36 are pulled towards the diaphragm spring 13, the wedge collars 35 expand radially outward, and the state therefore becomes one in which the wedge collars 35 contacts the pressure plate 11. As a result, the pressure plate 11 moves away from the clutch disk 6 and the clutch engagement is terminated.

When the clutch disk 6 becomes worn, the support mechanism 12 and pressure plate 11 are moved towards the flywheel 2 by the biasing pressure force of the diaphragm spring 13. Since, at this time, the wedge collars 35 of the restraining mechanisms 26 have one end contacting the outer surface of the flywheel 2, the wedge collars 35, wedges 36 and bolts 37 do not move relative to the flywheel 2. As a result, a gap corresponding to the wear is produced between the heads of the bolts and the flange 20a of the base cover 20.

If, in this condition, a release control action is performed, the urging force of the coil springs 33 causes the first taper blocks 31 to move in a direction in which they push the second taper blocks 32 upwards, since the diaphragm spring 13 and the base cover 20 are no longer in contact. As a result, the second taper blocks 32, the base cover 20 and the support plate 22 move towards the diaphragm spring 13 side. This movement brings the flange 20a of the base cover 20 into contact with the heads of the bolts 37. After establishment of this contact, movement of the base cover 20 stops, since, in the same way as described above, the action of the restriction elements 26 makes the bolts 37 unable to move relative to the pressure plate 11. It is noted that when the second taper blocks 32 move in the axial direction, the guide elements 34 are not liable to move accompanying the second taper blocks 32, since the grooves 32c permit the second taper blocks 32 to move axially with respect to the guide elements 34. The attitude of the coil springs 33 is thus kept constant.

As the result of the above action, the support mechanism 12 including the base cover 20 moves towards the diaphragm spring 13 by an amount corresponding to the amount of wear of the clutch disk 6 and then stops. Since, in this situation, the flange 20a of the base cover 20 is in contact with the heads of the bolts 37 of the restraining mechanisms 26, the height of the support mechanism 12 (the support plate 22) in the axial direction is the same as the initial height. Therefore, even if the clutch disk 6 has become worn, there is no change in the biasing attitude of the diaphragm spring 13 at the time it is set and the set load is maintained at the initial load.

In the above wear compensation action, since plural elements which make up the ring plate 27 are disposed round the whole circumference without any gaps between them, they synchronously move circumferentially due to the urging force of the coil springs 33. Consequently, the plurality of second taper blocks 32 are moved in an axial direction generally synchronously toward the diaphragm spring 13 in response to arcuate movement of the ring plate 27. Therefore, the base cover 20 and support plate 22 remain at a generally uniform height, without tilting. Consequently, variation in the lever portion height in the diaphragm spring 13 is suppressed and clutch engagement and disengagement faults are reduced. Further, since the ring plate 27 is divided into plural arcuate elements, the structure is simple and the manufacturing cost is relatively low.

Since wedge mechanisms are used for moving the base cover 20, the diaphragm spring 13 can be freely designed so that it is deflected in the circumferential direction or the radial direction, as design needs dictate. For instance, in the embodiment depicted, the clutch mechanism is a pull-type clutch. The wedge mechanisms described herein with the base cover 20 could also be employed in a push-type clutch mechanism. Further, since independent first taper blocks 31 and second taper blocks 32 are used, there is no need to form a sloping surface on the base cover 20. Also, since the structure is such that the wedge mechanisms 28 act in the circumferential direction, adverse effects are less likely to occur due to the rotational speed of the flywheel 2. In fact, the first taper blocks 31 and second taper blocks 32 become positioned correctly by being pushed towards the outer periphery. Therefore, the amount of movement of the base cover 20 is in more accurate correspondence to the amount of wear of the clutch disk 6 and the biasing attitude of the diaphragm spring 13 is accurately maintained.

The advantages of the urging mechanisms 25 in operation include the following.

(a) Since the coil springs 33 are not in direct contact with the ring plate 27, they are less likely to be affected by heat from the pressure plate 11. Therefore, it is made possible to suppress undesirable changes in response characteristics of the clutch engagement and disengagement process caused by heat generation.

(b) Since the second taper blocks 32 and the guide elements 34 are engaged in a manner permitting relative axial movement, when the second taper blocks 32 move in the axial direction there is no occurrence of deformation of the guide elements 34 due to their being dragged along by the second taper blocks 32. In other words, the attitudes of the coil springs 33 are kept constant.

Next, the work of assembling the urging mechanisms 25 will be described.

First, each portion of the ring plate 27 to which a first taper block 31 is fixed is installed in the step portion 11b of the pressure plate 11. Next, the base cover 20, to which the second taper blocks 32 are fixed, is set on the ring plates 27. When this is done, the second slope surfaces 32a of the second taper blocks 32 come into contact with the first slope surfaces 31a of respective first taper blocks 31. The restraining mechanisms 26 are now set in place, so making it impossible for the base cover 20 to move in the axial direction.

Figure 8:
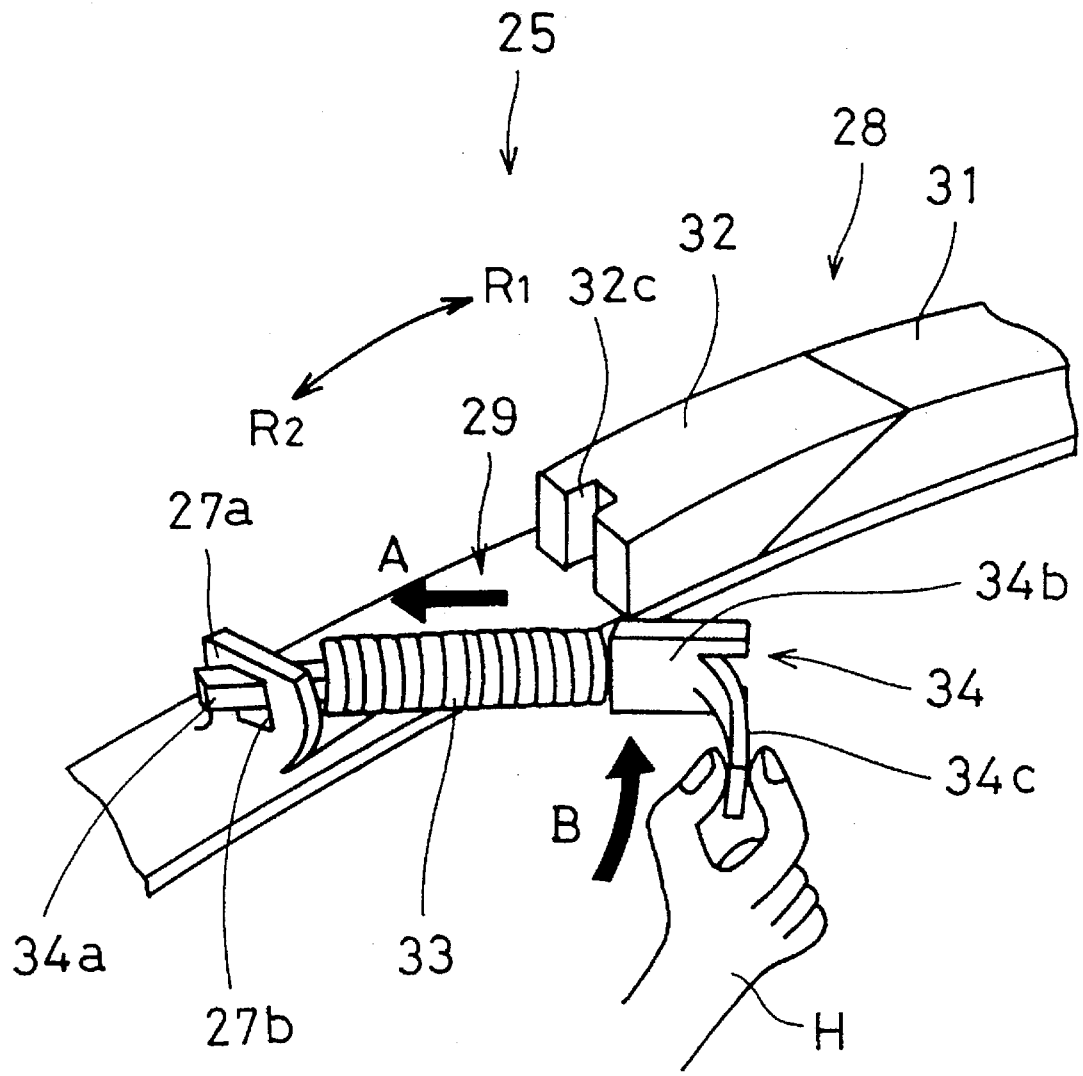
FIG. 8 is a fragmentary perspective view similar to FIG. 7 of a portion of the wear compensation mechanism depicted in FIGS. 4, 5, 6 and 7 illustrating an aspect of assembling a spring mechanism in the wear compensation mechanism.

Next, the spring mechanisms 29 are made ready by assembling respective coil springs 33 with guide elements 34. As illustrated in FIG. 8, a spring mechanism 29 is assembled together with a ring plate 27 and wedge mechanism 28 from the side that is the inner side in the radial direction. An operator or technician holds the projection 34c of the guide element 34 with his hand H in order to manipulate the spring mechanism 29. As shown in the drawing, the spring mechanism 29 is positioned obliquely, and the rod member 34a of the guide element 34 is inserted in the hole 27b of the riser 27a. The guide element 34 is pushed in the direction of the arrow A in FIG. 8, so compressing the coil spring 33. The wide portion 34c of the guide element 34 is inserted into the groove 32c of the second taper block 32.

The above spring mechanism 29 assembly operation has the following advantages.

(a) Since the guide elements 34 are detachably mountable on the ring plates 27, working efficiency in assembly is greatly improved. In particular, the compression of the coil springs 33 and engagement with the guide elements 34 can be effected simply but surely. The improvement of the working efficiency in assembly means that the assembly time is greatly reduced.

(b) Since the guide elements 34 are detachably mounted on the ring plates 27, the spring mechanisms 29 can be fitted after assembly of the guide elements 34 and the base cover 20. Therefore, movement of the base cover 20 can be prevented by the restraining mechanisms 26 prior to assembly of the spring mechanisms 29. In other words, at the time of assembly, the height of the base cover 20 can be kept constant without using a jig.

(c) The guide elements 34 are easier to manipulate, since they have projections 34c that extend radially inward.

Although the invention was applied to a pull-type clutch device in the example described above, it can also be similarly applied to a push-type clutch device.

[Advantages of the Invention]

In the clutch cover assembly according to the present invention, urging elements can be assembled in correct attitudes in the urging mechanism, since use is made of guide elements that are detachably mountable on the plate element. Also, the work of assembling the urging elements is easier and the assembly time is shortened. Further, since the work of assembly is easier, it is possible to assemble the urging elements and guide mechanisms in a state in which a support member is restrained from moving by restraining mechanisms. Therefore, the height of the support member can easily be kept constant at the time of assembly.

When the urging elements are coil springs and the guide elements are located inside the coil springs, there is no need for extra space for the guide elements, and the urging mechanism is therefore compact.

When the plate element has engagement portions that rise in the direction going away from the pressure plate, and the guide elements have one end engaging the engagement portions, the urging elements are guided at locations that are removed from the pressure plate, and consequently they are not as easily subjected to adverse effects caused by the heat of the pressure plate.

When the guide elements have projections which protrudes in directions that intersect the directions in which the resilient elements extend, an operator or technician can hold these projections and assemble the guide elements and urging elements in the urging mechanism. Because of this, the assembly work is simple, and the assembly time is shortened.

When the urging mechanisms further include wedge mechanisms and the support element is moved in a direction going away from the pressure plate as the result of the urging elements exerting urging force on the wedge elements, there is improvement of the degree of freedom of the orientation of the urging elements.

When the wedge mechanisms include first wedge elements and second wedge elements, and the urging elements urge the second wedge elements against the first wedge elements, there is no need to machine the support element, since pairs of elements are used.

When the other ends of the guide elements engage the second wedge elements in a manner permitting axial movement, the attitude of the guide elements and urging elements is not liable to be changed by the second wedge elements when the second wedge elements move in the axial direction.

When the urging elements urge the wedge mechanisms in the circumferential direction, effects are less likely to occur due to the rotational speed of the flywheel. It is therefore possible to maintain the attitude of the biasing pressure element with good precision in accordance with the amount of wear of the friction element.

When the plate element is ring-shaped, and the urging mechanism is constituted by installing sets consisting of wedge mechanisms, urging elements and guide elements on the plate element in plural locations in the circumferential direction, the sets of the urging mechanism act synchronously in the circumferential direction. Consequently variation of the height of the support element is suppressed, and tilting of the biasing pressure element is reduced.

When the plate element is divided into plural parts and so installed that it forms arcs, the structure is simplified and manufacturing costs are reduced.

Explanation of Reference Numerals in the Figures:
5 Clutch cover assembly
6 Clutch disk
10 Clutch cover
11 Pressure plate
12 Support mechanism
13 Diaphragm spring
14 Wear compensation mechanism
20 Base cover (support element)
22 Support plate
25 Urging mechanism
26 Restraining mechanism
27 Ring plate
28 Wedge mechanism
29 Spring mechanism
31 first taper block
32 second taper block
33 Coil spring
34 Guide element Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed:

1. A clutch cover assembly comprising:

a clutch cover connected to a flywheel;

a pressure plate disposed within said cover having a radially extending friction face formed on a first side thereof for engagement with a clutch disk disposed between said pressure plate and said flywheel;

a support element coupled to said pressure plate for rotation therewith and with axial displacement relative to said pressure plate;

a diaphragm spring biasing said pressure plate towards a flywheel via said support element;

an urging mechanism disposed between said pressure plate and said support element, having a plate element, urging elements supported by said plate element for biasing said support element towards said diaphragm spring, and guide elements which are detachably mounted on said plate element and at least partially retain said urging elements; and a restraining mechanism which allows for axial movement of said support element with respect to said pressure plate towards said diaphragm spring in response to wear of said clutch disk;

wherein said plate element engages said pressure plate and is formed with engagement portions which extend away from said pressure plate, and said guide elements have one end in engagement with said engagement portions.

2. The clutch cover assembly as in claim 1, wherein said urging elements are coil springs; and a portion of said guide elements extend through said coil springs.

3. The clutch cover assembly as in claim 1, wherein each of said guide elements is formed with a projection portion which extends in a direction which intersects the direction a corresponding one of said urging elements extends.

4. The clutch cover assembly as in claim 1, wherein each of said guide elements is formed with a projection portion which extends radially inwardly.

5. The clutch cover assembly as in claim 1, wherein said urging mechanism further includes a plurality of wedge mechanisms each having biasing means to urge said support element towards said diaphragm spring.

6. The clutch cover assembly as in claim 5, wherein each of said wedge mechanisms comprises:

a first wedge element having a first slope surface, said first wedge element being fixed to said plate element for rotary movement therewith;

a second wedge element formed with a second slope surface, said second wedge element fixed to said support element; and one of said urging element where said urging element urges said first wedge elements and said second wedge elements such that said second wedge elements move outwardly away from said pressure plate.

7. The clutch cover assembly as in claim 6, wherein one end of each of said guide elements is engaged with one of said second wedge elements for relative axial movement relative thereto.

8. The clutch cover assembly as in claim 6, wherein said urging elements urge said wedge mechanisms in the circumferential direction.

9. The clutch cover assembly as in claim 5, wherein said plate element is ring-shaped, and said urging mechanism includes plural sets of said wedge mechanisms, said urging elements and said guide elements on said plate element in the circumferential direction.

10. The clutch cover assembly as in claim 9, wherein said plate element is divided into plural arcuate segments.

11. A clutch cover assembly comprising:

a clutch cover connected to a flywheel;

a pressure plate disposed within said cover having a radially extending friction face formed on a first side thereof for engagement with a clutch disk disposed between said pressure plate and said flywheel;

a support element coupled to said pressure plate for rotation therewith and with axial displacement relative to said pressure plate;

a diaphragm spring biasing said pressure plate towards a flywheel via said support element;

an urging mechanism disposed between said pressure plate and said support element, having a plate element, urging elements supported by said plate element for biasing said support element towards said diaphragm spring, and guide elements which are detachably mounted on said plate element and at least partially retain said urging elements, and a restraining mechanism which allows for axial movement of said support element with respect to said pressure plate towards said diaphragm spring in response to wear of said clutch disk;

wherein each of said guide elements is formed with a projection portion which extends in a direction which intersects the direction a corresponding one of said urging elements extends.

12. The clutch cover assembly as in claim 11, wherein said urging elements are coil springs; and a portion of said guide elements extend through said coil springs.

13. The clutch cover assembly as in claim 11, wherein said plate element engages said pressure plate and is formed with engagement portions which extend away from said pressure plate, and said guide elements have one end in engagement with said engagement portions.

14. The clutch cover assembly as in claim 11, wherein each of said guide elements is formed with a projection portion which extends radially inwardly.

15. The clutch cover assembly as in claim 11, wherein said urging mechanism further includes a plurality of wedge mechanisms each having biasing means to urge said support element towards said diaphragm spring.

16. The clutch cover assembly as in claim 15, wherein each of said wedge mechanisms comprises:

a first wedge element having a first slope surface, said first wedge element being fixed to said plate element for rotary movement therewith;

a second wedge element formed with a second slope surface, said second wedge element fixed to said support element; and one of said urging element where said urging element urges said first wedge elements and said second wedge elements such that said second wedge elements move outwardly away from said pressure plate.

17. The clutch cover assembly as in claim 16, wherein one end of each of said guide elements is engaged with one of said second wedge elements for relative axial movement relative thereto.

18. The clutch cover assembly as in claim 16, wherein said urging elements urge said wedge mechanisms in the circumferential direction.

19. The clutch cover assembly as in claim 15, wherein said plate element is ring-shaped, and said urging mechanism includes plural sets of said wedge mechanisms, said urging elements and said guide elements on said plate element in the circumferential direction.

20. The clutch cover assembly as in claim 19, wherein said plate element is divided into plural arcuate segments.

21. A clutch cover assembly comprising:

a clutch cover connected to a flywheel;

a pressure plate disposed within said cover having a radially extending friction face formed on a first side thereof for engagement with a clutch disk disposed between said pressure plate and said flywheel;

a support element coupled to said pressure plate for rotation therewith and with axial displacement relative to said pressure plate;

a diaphragm spring biasing said pressure plate towards a flywheel via said support element:

an urging mechanism disposed between said pressure plate and said support element, having a plate element, urging elements supported by said plate element for biasing said support element towards said diaphragm spring, and guide elements which are detachably mounted on said plate element and at least partially retain said urging elements, and a restraining mechanism which allows for axial movement of said support element with respect to said pressure plate towards said diaphragm spring in response to wear of said clutch disk;

wherein each of said guide elements is formed with a projection portion which extends radially inwardly.

22. The clutch cover assembly as in claim 21, wherein said urging elements are coil springs; and a portion of said guide elements extend through said coil springs.

23. The clutch cover assembly as in claim 21, wherein said plate element engages said pressure plate and is formed with engagement portions which extend away from said pressure plate, and said guide elements have one end in engagement with said engagement portions.

24. The clutch cover assembly as in claim 21, wherein each of said guide demerits is formed with a projection portion which extends in a direction which intersects the direction a corresponding one of said urging elements extends.

25. The clutch cover assembly as in claim 21, wherein said urging mechanism further includes a plurality of wedge mechanisms each having biasing means to urge said support element towards said diaphragm spring.

26. The clutch cover assembly as in claim 25, wherein each of said wedge mechanisms comprises:
- a first wedge element having a first slope surface, said first wedge element being fixed to said plate element for rotary movement therewith;
- a second wedge element formed with a second slope surface, said second wedge element fixed to said support element; and
- one of said urging element where said urging element urges said first wedge elements and said second wedge elements such that said second wedge elements move outwardly away from said pressure plate.

27. The clutch cover assembly as in claim 26, wherein one end of each of said guide elements is engaged with one of said second wedge elements for relative axial movement relative thereto.

28. The clutch cover assembly as in claim 26, wherein said urging elements urge said wedge mechanisms in the circumferential direction.

29. The clutch cover assembly as in claim 25, wherein said plate element is ring-shaped, and said urging mechanism includes plural sets of said wedge mechanisms, said urging elements and said guide elements on said plate element in the circumferential direction.

30. The clutch cover assembly as in claim 29, wherein said plate element is divided into plural arcuate segments.

* * * * *